Feb. 2, 1965     W. D. WALTHER     3,168,167
SPOT TYPE DISK BRAKE
Filed Sept. 7, 1962     2 Sheets-Sheet 1
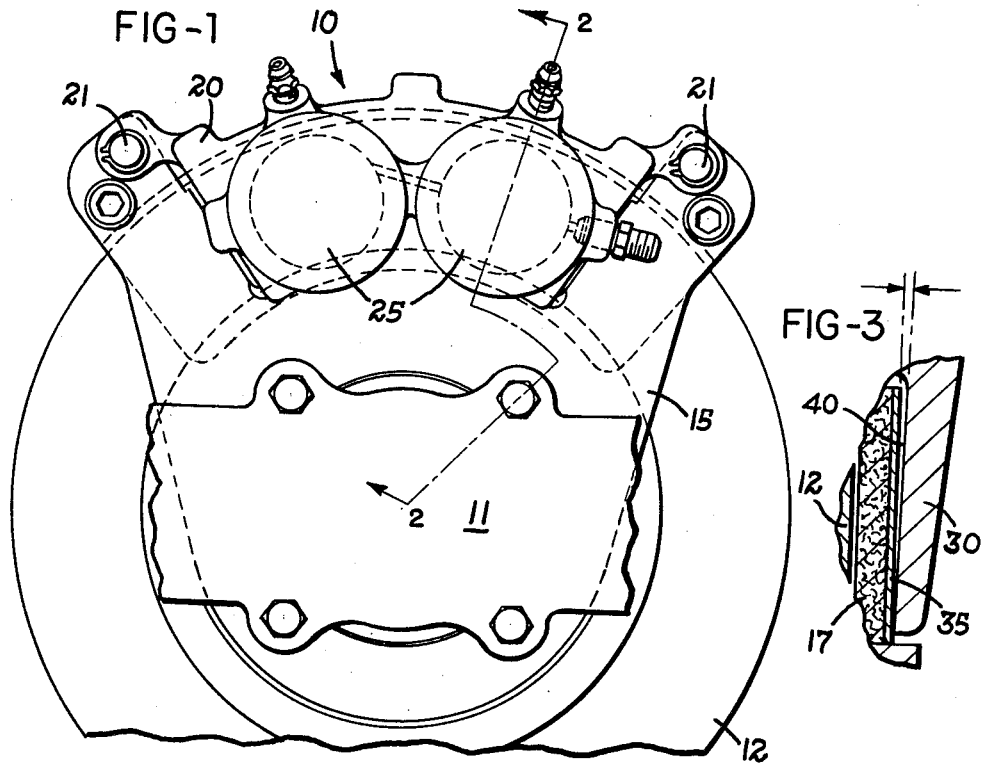
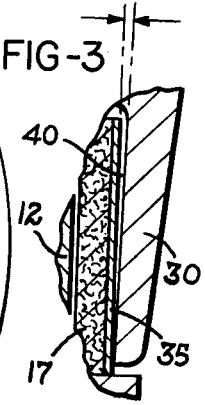
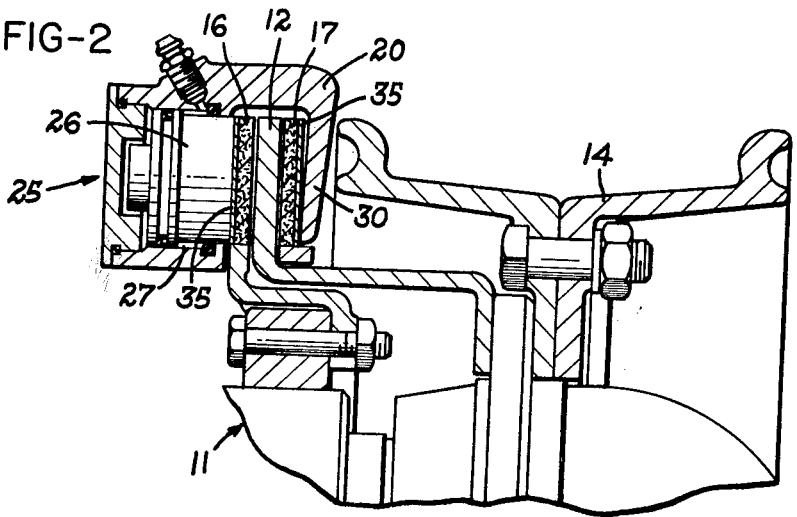
INVENTOR.
WILLIAM D. WALTHER
BY Marechal, Biebel, French & Bugg
ATTORNEYS

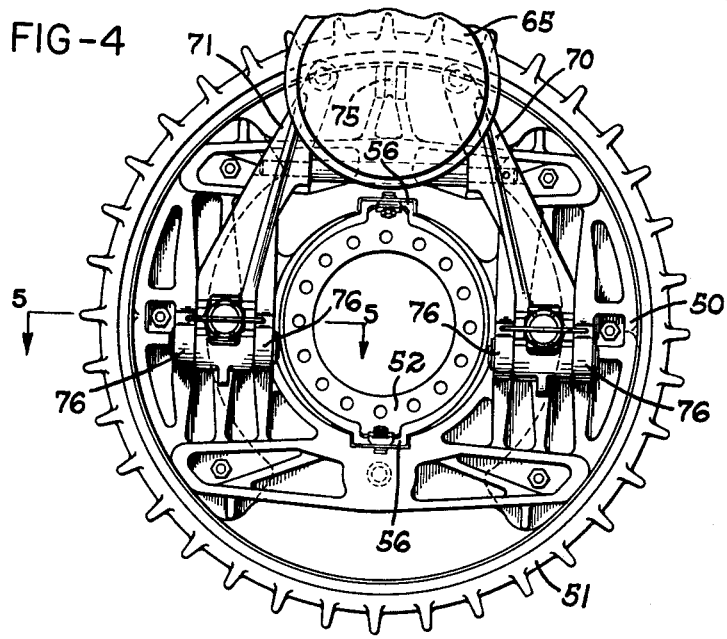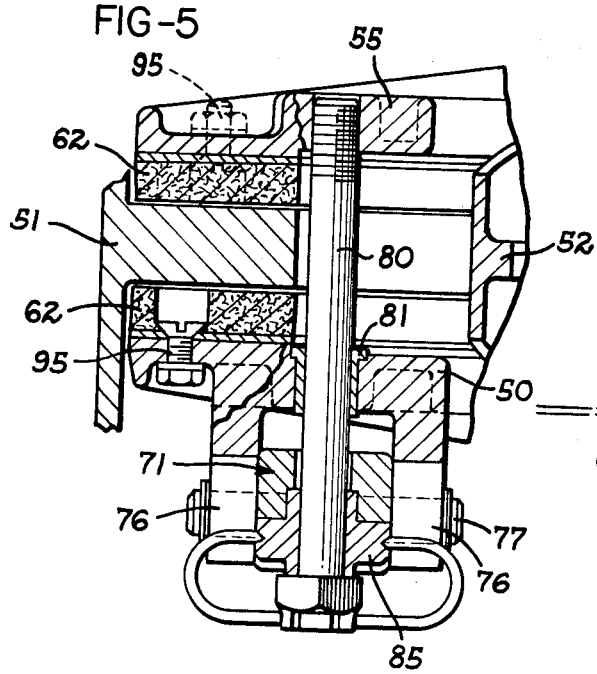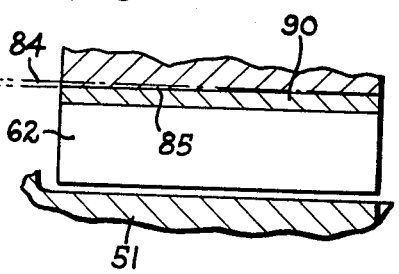

United States Patent Office 3,168,167
Patented Feb. 2, 1965

3,168,167
SPOT TYPE DISK BRAKE
William D. Walther, Dayton, Ohio, assignor to The Dayton Steel Foundry Company, Dayton, Ohio, a corporation of Ohio
Filed Sept. 7, 1962, Ser. No. 221,987
7 Claims. (Cl. 188—73)

This invention relates to disk brakes.

In a disk brake, whether it be of the caliper or pressure plate type, there is normally provided a housing which contains or supports pads of friction material for engagement with the opposed braking surfaces of the disk. The housing also normally contains one or more force applying motors which may be arranged to apply a direct force to the pad or pads on one side of the disk and a reaction force to the pad or pads on the other disk side.

In a caliper brake, the pad opposite the hydraulic cylinder may be moved into braking engagement by means of the caliper housing either through the aligning movement of a splinded disk or axial movement of a caliper housing. In a plate type disk brake, the braking force may be effected by direct application of force to one plate and by indirect application of a reaction force to the opposite plate.

In any such disk brake arrangement, the respective brake force applying members on each side of the disk are subject to temporary elastic deflection by reason of the forces applied during the application of the brakes. This deflection is, of course, greatest during severe or heavy application of the brakes, and increases with increasing beam distance along the member. This deflection or deformation of the brake parts has been recognized. The effects thereof as regards the automatic compensation for wear, to maintain a desired retraction gap, have been accounted for by automatic brake adjusting mechanisms, such as described and claimed in the copending applications of Dotto, Serial No. 859,172, filed December 14, 1959, now Patent No. 3,064,768, Serial No. 859,492, filed December 14, 1959, now Patent No. 3,064,765, and Serial No. 65,806, filed October 28, 1960, now Patent No. 3,125,187, all assigned to the same assignee as this application.

However, the deflection of the brake force applying member results in uneven forces across the pads of friction material. This causes hot spots or bands on the disk, and loads one part of the disk greater than another part. It also causes uneven wearing of the brake pads requiring that the pads be replaced sooner than would otherwise be required if the pads wore evenly. The elastic deflection or bending of the brake components and the resulting uneven temperature distribution radially of the disk often causes warping of the disk, and the cracking or checking of the disk surface.

The adverse effects of the elastic deflection of the brake components which are in operative contact and engagement with the pads of friction material are substantially reduced in this invention by the provision of a tapered or inclined support for the pad of friction. The taper is extended inwardly toward the disk with increasing beam distance from the point of actuation of the brake member or its point of support. It is within the scope of this invention to provide a taper in the brake actuating or backing member which is in force applying contact with the pad of friction material, or to provide a taper in the backing plate which normally forms a part of the friction pad, or both. Normally, there is no need to taper the adjoining face of a force applying piston, since the piston is normally self-aligning to a sufficient extent to accommodate for deflections of its housing. However, it is within the scope of this invention to so taper the piston face or the adjacent backing plate for the adjoining pad of friction material, as necessary, to eliminate uneven wear of the lining pad.

Another important object of this invention is the provision of the support for the pad of lining material defining a taper which slopes inwardly toward the disk with increasing distance from the point of support for the backing member. Preferably, the taper is of such an angle as to result in a substantially parallel relation between pads of uniform thickness during severe braking conditions.

Another object of this invention is the provision of a disk brake having a taper formed in the reaction portion thereof for supporting a pad of material in non-parallel relation to the adjacent surface of a disk when the brake is released, and for supporting the pad in substantially parallel relation thereto under the application of braking force.

A still further object of this invention is the provision of a pad of friction material having a taper formed in the backing plate thereof.

Other objects and advantages of the invention will be apparent from the following description, the accompanying drawings and the appended claims.

In the drawings—

FIG. 1 is an elevational view of a disk brake constructed according to this invention;

FIG. 2 is a transverse section taken generally along the lines 2—2 of FIG. 1;

FIG. 3 is an enlarged fragmentary view of a portion of FIG. 2;

FIG. 4 is an elevational view of a clamp type brake showing another embodiment of the invention;

FIG. 5 is an enlarged transverse section taken generally along the line 5—5 of FIG. 4; and FIG. 6 is an enlarged fragmentary view of a portion of FIG. 5.

Referring to the drawings which illustrate preferred embodiments of the invention, a clamp or caliper type disk brake embodying the invention is illustrated generally at 10 in FIG. 1 as being mounted upon a fixed frame or axle 11 of a vehicle. The caliper disk brake of FIGS. 1–3 may be constructed generally according to the teachings of the copending application of Dotto and Walther Serial No. 31,678, filed May 25, 1960, now Patent No. 3,081,843, and includes a disk 12 mounted for rotation with a wheel 14, and a fixed torque member 15 mounted on the axle 11.

The torque member 15 includes structure which defines a brake pad receiving opening adjacent each side of disk 12 for receiving brake pads 16 and 17 for axial braking movement while preventing rotational movement of the pads.

A slotted clamp or caliper housing 20 is mounted on pilot bolts 21 on the extended end of the torque member 15 for self-aligning axial movement. The caliper housing 20 includes direct force applying means adjacent the pad 16 in the form of one or more hydraulic piston motors 25 each of which include a piston 26 slidably received within a cylinder bore 27. The caliper housing 20 also includes a reaction portion 30 encircling a peripheral portion of the disk 14 for applying axial braking force to the opposite pad 17 of frictional material.

The opposed pads of friction material 16 and 17 are preferably of uniform cross sectional thickness. Each is preferably formed with a bonded metallic backing plate 35, as shown in FIG. 3.

The brake 10 includes means compensating for the elastic deflection of the caliper housing 20 under high braking stress. This consists of a taper 40 formed on the inside surface of the reaction portion 30 at the junction of the caliper housing, and the pad 17. The taper 40 may be formed in the housing arcuately of the reaction portion 30 so that the slope of the taper, at any radial position, lies along a radius. In other words, the taper 40 is preferably formed with a conical surface of generation. However, where the clamp housing encircles a minor or small segment of the disk, the actuating surface of the reaction portion may be formed with a planar surface which is inclined to the planar surface of the disk 12 to define the taper 40.

The preferred embodiment of this invention provides a taper only in the reaction portion of the disk brake, at the junction of the pad 17 and the housing 20. It is usually not necessary to taper the joining surface of the hydraulic piston, due to the fact that the hydraulic piston is self-aligning within its bore. However, it is within the scope of this invention to provide a taper in both the pressure and reaction portions, and an example of this is shown in the embodiment of the invention as applied to the brake of FIGS. 4–6.

The deflection compensating taper in the force applying member of the brake slopes inwardly toward the disk with increasing radial distance from the region of common connection with the primary force applying portion. Thus, in FIG. 2 the taper 40 slopes inwardly toward the disk 12 with increasing distance from the joining or bridging portion of the housing 20.

The slope or degree of inclination of the taper 40 is such as to provide a substantially parallel relationship between the opposed force applying surfaces of the caliper housing and the adjacent braking surfaces of the disk 12 under severe braking conditions. Accordingly, where the disk 12 has opposite parallel braking surfaces, the taper is such that the opposed brake applying surfaces within the caliper housing becomes parallel to each other and to the disk during high stress braking conditions.

The degree of the taper 40 can be varied over limits which should take into consideration the elasticity or rigidity of the member by which the braking forces are applied and the hydraulic pressures anticipated. Generally, the slope should be such as to cause the adjacent pad of friction material to be applied to the disk substantially uniform radially of the disk under conditions of maximum braking force. It has been found that a taper of 1° to 5° in a caliper type brake as shown in FIGS. 1–3 is sufficient for this purpose.

FIGS. 4–6 show the invention as applied to a plate type brake. The brake illustrated in FIGS. 4 and 5 may be constructed according to the teachings of the copending application of Dotto and Walther Serial No. 185,333, filed April 5, 1962, and assigned to the same assignee as this application. The plate type brake includes a clamping plate 50 positioned on one side of an inwardly extending disk 51 and supported on a central torque member 52. Another clamping plate 55 (FIG. 5) similar to the plate 50, is supported on the member 52 on the opposite side of the disk 51. The plates 50 and 55 may be splined as indicated at 56 in FIG. 4, for axial braking movement on the torque member 52 against the opposite sides of the disk 51.

The clamping members or plates 50 and 55 are each provided with a pair of arcuately shaped friction pads 62, with the pads on the plate 50 aligned opposite to the corresponding pads on the plate 55. The broken outline of the two pads 62 carried by the plate 50 are shown in FIG. 4, and a section of one of the opposed pads 62 on the plate 55 is shown in FIG. 5.

The primary force applying agent in this brake may consist of a diaphragm air motor 65 which is mounted and supported directly on the plate 50 on a pair of actuating arms 70 and 71, as shown in FIG. 4. The actuation or operation of the motor 65 results in a direct force against the plate 50 at a buttress 75 near the top of the plate, and at links 76 pivotally carried on the arms 70 and 71, on transverse pins 77 below the axis of rotation of the disk. The operation of the motor 70 causes an axial force to be applied at the buttress 75 and at the pivot links 76 thereby effecting the axial braking movement of the pair of arcuate pads 62 against the adjacent surface of the disk 60.

The opposite plate 55 is operated by means of a pair of draw bolts 80 which are connected at their outer ends to the respective arms 70 and 71 and which are threaded at their inner ends into the plate 55, as shown in FIG. 5. The draw bolts 80 extend inwardly of the inner periphery of the disk 51 and are each guided in their movement by a bushing 81 carried within the plate 50. The outer ends of the bolts 80 carry a pintle bushing 85 forming a pivotal thrust connection with the arms 70 and 71. Therefore, the operation of the motor 70 effects a reaction force on the plate 55 through the draw bolts 80 by reason of the outward movement of the arms 70 and 71 on the links 76.

The bending moment upon the opposed plates 50 and 55 occurs about the regions of common connection, that is immediately inwardly of the periphery of the disk. Accordingly, the elastic deflection which occurs in a disk brake of this construction results in greater forces being applied adjacent the inside edge of the disk with diminishing forces being applied adjacent its outer dimension or periphery. If not compensated for, this results in greater wear and heat generation at the inside of the pads 62 as compared to the outside, and results in uneven heat distribution radially of the disk 60.

To overcome these difficulties, a taper 84 is applied to each of the pressure plates 50 and 55 preferably at the surface 85 joining the disk backing plates 90 with the respective pressure plates 50 and 55. This taper, as in the case of the taper 40, is such as to provide substantially uniform forces radially of the pads during conditions of high braking forces. As can be easily seen in FIG. 6 the taper is such that the pad 62 extends or is inclined toward the surface of the disk with increasing radial distance from the common connection of the brake applying members, that is, within increasing radial distance from the draw bolts 80.

Since the pads 62 encompass a substantial portion of the disk 60, the taper is preferably constant arcuately of the pad. The pad fastening means, such as the recessed bolts 95, are sufficient to cause the pads 62 and their backing plates 40 to bend slightly to conform to the radius of the conical surface defined by the taper 84.

It is within the scope of this invention to provide a taper wholly within the backing plates 90 or 35, which taper could conveniently be rolled into the plates. In the embodiment shown in FIGS. 4–6, the taper 84 is formed on the adjoining and supporting surfaces of each of the pressure or plate members 50 and 55, although it is within the scope of this invention to provide such a taper in only one of these plates.

Again, the amount of taper depends upon the elasticity of the clamping parts, and may range anywhere from a fraction of a degree up to five degrees or more. A greater taper may be used where the circumstances require, although a greater taper results in an increase in the power stroke required of the hydraulic or air actuating mechanism.

As an example, a brake lining originally 0.45 inch thick was found to wear, without this invention, to 0.30 inch at one edge and 0.23 inch at the other edge. The provision of a taper in the pad support member, as described above, reduced the wear differential to 0.01 inch and resulted in an average extension in twenty-five percent in the life of the brake lining. This increase in lining wear is attributed solely to the provision of a taper within the support. At low braking pressures the wear on the lining is proportionately less, and the presence of a taper under such low or moderate braking conditions in no way reduces the effectiveness of the brake. However, under high stress braking conditions, where the heat generated and the rate of wear of the lining is the greatest, the taper assures that a substantially parallel relationship exists between the braking members and the disk surfaces, and provides substantially uniform forces radially of the lining pads, thereby increasing the life of the lining and the life of the disk by providing more uniform heat distribution radially of the disk.

The teachings of this invention may readily be applied to existing brakes as well as to new brakes. In this case, lining pads may be made with backing plates provided with a taper which is machined or rolled into the plate. In instances where backing plates are not used, the advantages of this invention may be had by suitably tapering the lining at the junction of the lining with the support plate, or by supporting the lining on shims. The pads are preferably essentially rigid and are provided with back surfaces, such as by the plates 35 or 90, for contact over an extended area of the surface of the adjacent force applying member. It will be understood that the term "taper" as used in the specification and claims means any arrangement whereby a friction pad is held at an inclination to the surface disk to comepnsate for the elastic deflection of the supporting or force applying member under braking stress.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A disk brake including a rotating disk and a nonrotating friction pad support member subject to non-uniform elastic deflection axially outwardly from said disk upon actuation of said brake and a friction pad on said support member movable into braking engagement with said disk, the improvement comprising means at the junction of said pad and said pad support member defining a tapered surface supporting said pad at an inclination to said disk with no braking force thereon, the inclination of said surface being in a direction generally radially of said disk and sloping toward said disk with increasing radial distance from the disk periphery providing substantially uniform forces radially of said pad during conditions of said elastic deflection of said support member.

2. A disk brake comprising a rotatable disk, a slotted clamp-housing subject to temporary elastic deflection upon the application of said brake and encircling an arcuate portion of said disk, means forming pad engaging opposed surfaces in said clamp housing, opposed pads of friction material received in said housing adjacent said surfaces for engagement with the opposite sides of said disk, and at least one of said surfaces being provided with a taper extending generally uniformly toward said disk in a sense opposite to the elastic deflection of said housing under braking stress providing a generally parallel relation between said one surface and the adjacent said pad engaging side of said disk during severe braking.

3. In a plate type disk brake, a rotatable disk, a first non-rotating plate member positioned generally on one side of said disk and movable axially thereto, a pad of friction material positioned between said first member and said disk and movable by said first member into frictional engagement with said disk, a second non-rotating plate member on an opposite side of said disk from said first member, a second pad of friction material positioned between said second member and said disk and movable by said second member into frictional engagement with said disk, operator means for applying braking forces to said members to move said members and associated pads into said frictional engagement, and means defining a taper at the surface joining each said pad with the associated said members with the slope of said taper extending toward said disk with increasing radial distance from the region of force application thereto by said operator means.

4. In a disk brake including an annular disk and a pair of pressure plates slidably mounted for braking movement one on each side of said disk each carrying at least one brake pad for frictional engagement with the opposite sides of said disk, and each of said plates being subject to temporary elastic deflection during severe braking conditions, the improvement comprising means supporting each said pad on an associated pressure plate at an inclination to said disk in a direction generally radially of said disk providing substantially uniform forces radially of said pads during conditions of said temporary deflection of said plates.

5. A disk brake comprising a rotating disk, a non-rotating brake force applying member adjacent said disk and being subject to temporary elastic deflection axially of said disk with said deflection being non-uniform radially of said disk upon the application of braking force thereto, a pad of friction material received between said member and said disk and being movable by said member into frictional engagement with said disk, means in said brake defining a contact and force transmitting surface between said pad of friction material and said brake member extending over a substantial radial extent of said pad, said surface being provided with a slope inclined toward said disk with increasing radial distance from the periphery of said disk applying generally uniform forces to said pad radially of said disk during said elastic deflection of said brake member.

6. The disk brake of claim 5 wherein said brake force applying member comprises a caliper housing, and wherein said surface is formed in said caliper housing.

7. The brake of claim 5 wherein said force applying member comprises a plate position substantially wholly on one side of said disk and movable axially of said disk to apply a braking force to said pad, and wherein said surface is formed in said plate.

References Cited in the file of this patent

UNITED STATES PATENTS

| | | |
|---|---|---|
| 2,392,970 | Bricker | Jan. 15, 1946 |
| 2,485,993 | Van Halteren | Oct. 25, 1949 |
| 3,081,843 | Dotto et al. | Mar. 19, 1963 |